United States Patent
Beeler et al.

(10) Patent No.: US 8,633,926 B2
(45) Date of Patent: Jan. 21, 2014

(54) MESOSCOPIC GEOMETRY MODULATION

(75) Inventors: Thabo Dominik Beeler, Grison (CH); Bernd Bickel, Zurich (CH); Markus Gross, Uster (CH); Robert Sumner, Zurich (CH); Paul Beardsley, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 736 days.

(21) Appl. No.: 12/689,170

(22) Filed: Jan. 18, 2010

(65) Prior Publication Data
US 2011/0175900 A1 Jul. 21, 2011

(51) Int. Cl.
*G06T 11/40* (2006.01)
*G06T 15/04* (2011.01)
*G06T 11/00* (2006.01)

(52) U.S. Cl.
USPC ........... 345/423; 345/422; 345/581; 345/582; 382/190; 382/191

(58) Field of Classification Search
USPC ........... 345/422, 423, 581, 582; 382/190, 191
See application file for complete search history.

(56) References Cited

U.S. PATENT DOCUMENTS

| | | | | |
|---|---|---|---|---|
| 6,072,496 A * | 6/2000 | Guenter et al. | | 345/419 |
| 6,198,486 B1 * | 3/2001 | Junkins et al. | | 345/419 |
| 6,271,847 B1 * | 8/2001 | Shum et al. | | 345/418 |
| 6,614,428 B1 * | 9/2003 | Lengyel | | 345/420 |
| 2004/0076313 A1 * | 4/2004 | Bronstein et al. | | 382/118 |
| 2005/0083340 A1 * | 4/2005 | Sloan et al. | | 345/582 |
| 2006/0028468 A1 * | 2/2006 | Chen et al. | | 345/424 |
| 2007/0229502 A1 * | 10/2007 | Tong et al. | | 345/426 |
| 2008/0246765 A1 | 10/2008 | Grenfell | | |

OTHER PUBLICATIONS

Bernd Bickel, Mario Botsch, Roland Angst, Wojciech Matusik, Miguel Otaduy, Hanspeter Pfister, and Markus Gross, "Multi-scale capture of facial geometry and motion", ACM Transactions on Graphics, vol. 26, Issue 3, Article 33, Jul. 2007, 10 pages.*

Nehab, D., Rusinkiewicz, S., Davis, J., and Ramamoorthi, R, 2005, "Efficiently combining positions and normals for precise 3d geometry", ACM Transactions on Graphics, vol. 24, Issue 3, pp. 536-543.*

Bernd Bickel, Tim Weyrich, Wojciech Matusik, Hanspeter Pfister, Craig Donner, Chien Tu, Janet McAndless, Jinho Lee, Addy Ngan, Henrik Wann Jensen, and Markus Gross, Jul. 30-Aug. 3, 2006, "Processing and editing of faces using a measurement-based skin reflectance model", ACM SIGGRAPH 2006 Sketches (SIGGRAPPH '06), ACM, New York, NY, Article 168.*

Bernd Bickel, Manuel Lang, Mario Botsch, Miguel A. Otaduy, and Markus Gross, Jul. 7-9, 2008, "Pose-space animation and transfer of facial details", Proceedings of the 2008 ACM SIGGRAPH/Eurographics Symposium on Computer Animation (SCA '08), Eurographics Association, Aire-la-Ville, Switzerland, pp. 57-66.*

(Continued)

*Primary Examiner* — Daniel Hajnik
(74) *Attorney, Agent, or Firm* — Patterson & Sheridan, LLP

(57) ABSTRACT

Techniques are provided for mesoscopic geometry modulation. A first set of mesoscopic details associated with an object is determined by applying a filter to an image of an object. Mesoscopic details included in the first set of mesoscopic details are detectable in the image of the object and are not detectable when generating a coarse geometry reconstruction of the object. A three-dimensional model for the object is generated by modulating the coarse geometry with the first set of mesoscopic details.

22 Claims, 4 Drawing Sheets

(56) References Cited

OTHER PUBLICATIONS

Volker Blanz and Thomas Vetter, 1999, "A morphable model for the synthesis of 3D faces", Proceedings of the 26th annual conference on Computer graphics and interactive techniques (SIGGRAPH '99), ACM Press/Addison-Wesley Publishing Co., New York, NY, USA, pp. 187-194.*

Chen T., Goesele M., Seidel H.-P.: Mesostructure from specularity. In CVPR '06: Proceedings of the 2006 IEEE Computer Society Conference on Computer Vision and Pattern Recognition, vol. 2, pp. 1825-1832.*

Ben Cloward, "Normal Maps: Part II—Beyond the Basics: Tips for Editing Normal Maps", www.bencloward.com, last updated Jul. 4, 2005, pp. 1-6, published at http:l/www.bencloward.com/tutorials_normal_maps12.shtml.*

Julie Dorsey, Holly Rushmeier, and François Sillion. 2008. Advanced material appearance modeling. In ACM SIGGRAPH 2008 classes (SIGGRAPH '08). ACM, New York, NY, USA, , Article 5 , 145 pages.*

Xianfeng Gu, Song Zhang, Peisen Huang, Liangjun Zhang, Shing-Tung Yau, and Ralph Martin, Jun. 2006, "Holoimages", Proceedings of the 2006 ACM symposium on Solid and physical modeling (SPM '06), ACM, New York, NY, USA, pp. 129-138.*

Gero Müller, "Data-Driven Methods for Compression and Editing of Spatially Varying Appearance", Dissertation, der Rheinischen Friedrich-Wilhelms-Universität Bonn, Bonn Germany, Dec. 2008, 170 pages.*

Thiago Pereira and Luiz Velho, Oct. 2009, "RGBN Image Editing", Proceedings of the 2009 XXII Brazilian Symposium on Computer Graphics and Image Processing (SIBGRAPI '09), IEEE Computer Society, Washington, DC, USA, pp. 24-31.*

Pedro V. Sander, Xianfeng Gu, Steven J. Gortler, Hugues Hoppe, and John Snyder, 2000, "Silhouette clipping", Proceedings of the 27th annual conference on Computer graphics and interactive techniques (SIGGRAPH '00), ACM Press/Addison-Wesley Publishing Co., New York, NY, USA, pp. 327-334.*

O. Sorkine, D. Cohen-Or, Y. Lipman, M. Alexa, C. Rössl, and H.-P. Seidel, 2004, "Laplacian surface editing", Proceedings of the 2004 Eurographics/ACM SIGGRAPH symposium on Geometry processing (SGP '04). ACM, New York, NY, USA, 175-184.*

Tim Weyrich, Wojciech Matusik, Hanspeter Pfister, Bernd Bickel, Craig Donner, Chien Tu, Janet McAndless, Jinho Lee, Addy Ngan, Henrik Wann Jensen, and Markus Gross, 2006, "Analysis of human faces using a measurement-based skin reflectance model", ACM SIGGRAPH 2006 Papers (SIGGRAPH '06), ACM, New York, NY, USA, pp. 1013-1024.*

Rony Zatzarinni, Ayellet Tal, and Ariel Shamir, 2009, "Relief analysis and extraction", ACM Transactions on Graphics, vol. 28, Issue 5, Article 136, Dec. 2009, 9 pages.*

Tamy Boubekeur and Marc Alexa. 2008. Phong Tessellation. ACM Transactions on Graphics, vol. 27, Issue 5, Article 141 (Dec. 2008), 5 pages.*

Gielis, J., (May 2007), "Mesostructure from specularity using a raster display and a digital camera", from: http://scholar.google.com/scholar?cluster=15743611399601063743&hl=en&as_sdt=0,47.*

Aleksey Golovinskiy, Wojciech Matusik, Hanspeter Pfister, Szymon Rusinkiewicz, and Thomas Funkhouser, 2006, "A statistical model for synthesis of detailed facial geometry", ACM Transactions on Graphics, vol. 25, Issue 3 (Jul. 2006), pp. 1025-1034.*

Hertzmann, A.; Seitz, S.M., "Shape and materials by example: a photometric stereo approach", Proceedings 2003 IEEE Computer Society Conference on Computer Vision and Pattern Recognition, 2003, vol. 1, 8 pages, Jun. 18-20, 2003.*

Hiep, Vu Hoang, et al., "Towards high-resolution large-scale multi-view stereo", IEEE Conference on Computer Vision and Pattern Recognition, 2009, CVPR 2009, pp. 1430-1437.*

Wan-Chun Ma, Andrew Jones, Jen-Yuan Chiang, Tim Hawkins, Sune Frederiksen, Pieter Peers, Marko Vukovic, Ming Ouhyoung, and Paul Debevec. 2008. Facial performance synthesis using deformation-driven polynomial displacement maps. ACM Trans. Graph. 27, 5, Article 121 (Dec. 2008), 10 pages.*

* cited by examiner

MESOSCOPIC GEOMETRY MODULATION

BACKGROUND

1. Field of the Invention

The present invention relates to the field of computer graphics and, in particular, to a system and method for mesoscopic geometry modulation.

2. Description of the Related Art

Recently there has been an increasing demand for three-dimensional (3D) face models. The movie industry relies more and more on computer graphics (CG) to place human actors in situations that are physically not feasible. In some situations, the actor is completely replaced by a corresponding virtual counterpart since the required shots would endanger the actor.

To integrate the actors or their CG representations seamlessly, light and shadows cast from other objects must be matched. Conventional approaches using coarse facial models are not sufficient since the human eye is trained to read faces, so even subtle imperfections are spotted immediately. Also, secondary effects, such as wrinkle formation, are especially hard and tedious to create for an animator, but these secondary effects are essential for natural face appearance.

Physical simulation is currently being investigated for facial capture but is very difficult to implement since the human face is a highly complex and non-linear structure. Currently, the only practical option is to acquire a model of the face using 3D capture. The acquired models can be either integrated directly into a movie or can be used to control other faces. In addition, the movie industry is not the only industry that demands realistic face models. Computer games have a demand for virtual characters. Also, medical science has an interest in such models.

Conventional approaches to 3D capture may be classified as either depth estimation techniques or normal estimation techniques. The depth variation of mesoscopic skin details, such as pores and wrinkles, is in the micrometer range. Most depth estimation techniques simply cannot achieve that level of detail with current hardware. Laser scanning is capable of recovering depth variations at these scales, but this technology produces insufficient results because of the translucency of skin. As a workaround, a plaster mold of the face is scanned instead. Each of these depth estimation techniques suffers from various drawbacks, including the cumbersome process of obtaining a plaster mold of the actor's face.

Normal estimation techniques distinguish between diffuse and specular normals that emanate from the surface of an object. The specular normals encode much higher detail than the diffuse normals. The diffuse and specular normals can be estimated based on the light reflected at the surface of the subject. Every normal reflects light from a different direction. Given the direction of the light, the normal may be estimated. Two opposing lines of research exist depending on the direction of the incident light. The first line of research uses a single light source at a known position and known direction. However, to sample the whole space of possible normals, the light has to be moved. Thus, the system is only suited for static scenes. The second line of research places light sources all around the subject. The issue here is to distinguish from which light source the reflected light originates.

Conventional normal estimation techniques rely on polarization to separate the diffuse and specular parts and, thus, suffer from a variety of shortcomings. First, state-of-the-art implementations require up to thirteen frames for one scan. To be able to capture performances, these conventional techniques implement very expensive high-speed cameras. Still, the subject being captured is likely to move slightly during the capture process; thus, sophisticated image registration techniques have to be applied to re-align the captured frames. Furthermore, a short exposure time and the use of polarization significantly increase the amount of illumination required, leading to very high energy consumption and heat issues. Finally, polarization of the light limits conventional approaches to capturing a high-resolution specular normal map from only a single viewpoint.

As the foregoing illustrates, there is a need in the art for an improved technique for capture of high-resolution models, such as high-resolution face models.

SUMMARY

Embodiments of the invention provide a technique that uses heuristics to add mesoscopic detail to low-frequency geometry recovered by a reconstruction technique such as stereoscopic reconstruction. In certain embodiments, mesoscopic skin details are present within certain bands in the spatial frequency domain. Embodiments of the invention apply one or more bandpass filters to extract one or more different types of details from the subject. The features are then used to modulate the low-frequency geometry. In embodiments that use stereoscopic reconstruction to recover the low-frequency geometry, the detail is recovered from the same images used for the stereo reconstruction, which is one of the key advantages of this technique over normal estimation. No complicated setup is required—just two cameras. A facial model is then reconstructed from one image per camera. The results are visually plausible and the technique offers a low-budget alternative for smaller companies or private persons.

One embodiment of the invention provides a computer-implemented method for mesoscopic geometry modulation. The method includes determining a first set of mesoscopic details associated with an object by applying a filter to an image of an object, where mesoscopic details included in the first set of mesoscopic details are detectable in the image of the object and are not detectable when generating a coarse geometry reconstruction of the object, and generating a three-dimensional model for the object by modulating the coarse geometry with the first set of mesoscopic details.

One advantage of embodiments of the invention is the ability to generate results that are visually close to those produced by current state-of-the-art normal estimation approaches, but with much less cost.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
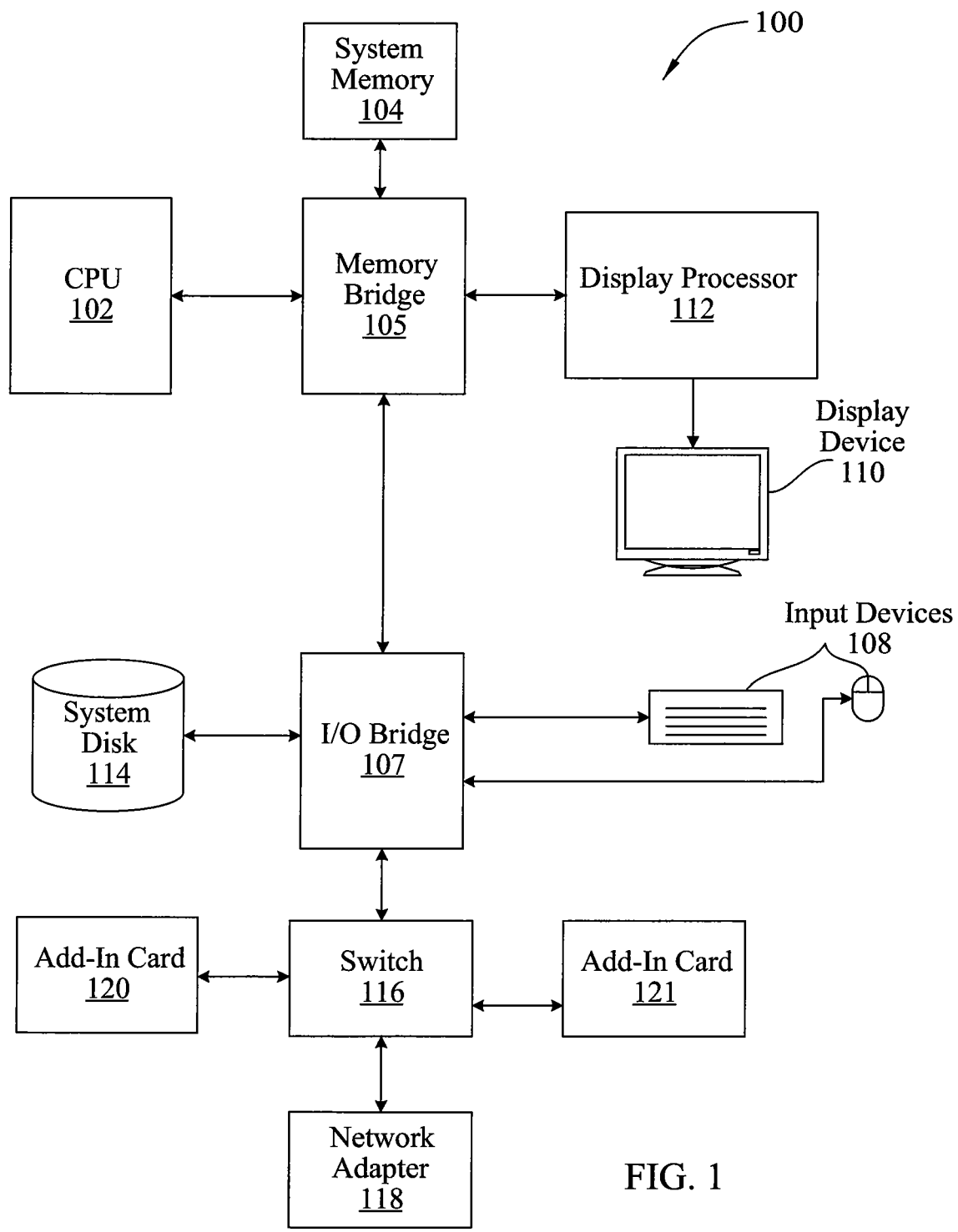
FIG. 1 is a block diagram of a system configured to implement one or more aspects of the present invention.

Embodiments of the invention provide a technique that uses heuristics to add mesoscopic detail to low-frequency geometry recovered by a reconstruction technique such as stereoscopic reconstruction. In certain embodiments, mesoscopic skin details are present within certain bands in the spatial frequency domain. Embodiments of the invention apply one or more bandpass filters to extract one or more different types of details from the subject. The features are then used to modulate the low-frequency geometry. In embodiments that use stereoscopic reconstruction to recover the low-frequency geometry, the detail is recovered from the same images used for the stereo reconstruction, which is one of the key advantages of this technique over normal estimation. No complicated setup is required—just two cameras. A facial model is then reconstructed from one image per camera. The results are visually plausible and the technique offers a low-budget alternative for smaller companies or private persons.

One embodiment of the invention provides a computer-implemented method for mesoscopic geometry modulation. The method includes determining a coarse geometry associated with a subject; applying a band-pass filter to an image of the subject to determine a first set of mesoscopic details associated with the subject, where the band-pass filter has a range of spatial frequencies that is associated with mesoscopic details included in the first set of mesoscopic details; and applying the first set of mesoscopic details to the coarse geometry to generate a three-dimensional model for the subject.

Skin is a complex structure that includes a variety of components. In some embodiments, skin can be considered at three different scales: a microscopic scale, a mesoscopic scale, and a macroscopic scale. Skin features in the microscopic scale are not perceivable in images captured by cameras, while the macroscopic scale is too coarse to be suited for detailed features. At the mesoscopic scale, features may be classified into two groups. A first group is based on color variation. Spots, freckles, and moles are examples of the first group of mesoscopic scale features. A second group is based on geometric variation. Pores, fine wrinkles, and facial hair belong to this group. In some embodiments, each of the features in the first and second groups lies in a particular range of the spatial frequency spectrum of an image.

Thus, according to embodiments of the invention, mesoscopic features can be extracted from an image based on the spatial frequency content of the image. In some embodiments, mesoscopic features are those features that are perceptible in an image of an object, but are not measurable in the coarse geometry that results from performing reconstruction, such as stereo reconstruction, of the object. In some embodiments, the coarse geometry may include larger scale features of the object than the mesoscopic features. For example, pore information can be extracted from an image. Pores cover the face in a very regular fashion and are well suited as features for image registration. Additionally, pores are typically isotropic (i.e., symmetrical along each axis). In one embodiment, an image can be filtered by an appropriately selected bandpass filter. The result can be further filtered with a Laplacian filter and a non-maxima suppression algorithm to find the location of the mesoscopic details. As a last step, embodiments of the invention may weight feature candidates by the response of the Laplacian. Other isotropic features, such as pimples, can be extracted in a similar fashion, while anisotropic features, such as wrinkles, may require different filters.

System Overview

FIG. 1 is a block diagram of a system 100 configured to implement one or more aspects of the present invention. System 100 may be a computer workstation, personal computer, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

According to embodiments of the invention, mesoscopic features can be extracted from an image based on the spatial frequency content of the image. Certain embodiments of the invention may be implemented in software stored in system memory 104 and executed by CPU 102 and/or display processor 112. Other embodiments may be implemented as one or more shader programs executed by display processor 112. Still further embodiments may be implemented in fixed function hardware included within display processor 112. Other embodiments may be implemented as a combination of hardware and software.

Mesoscopic Geometry Modulation

Figure 2:
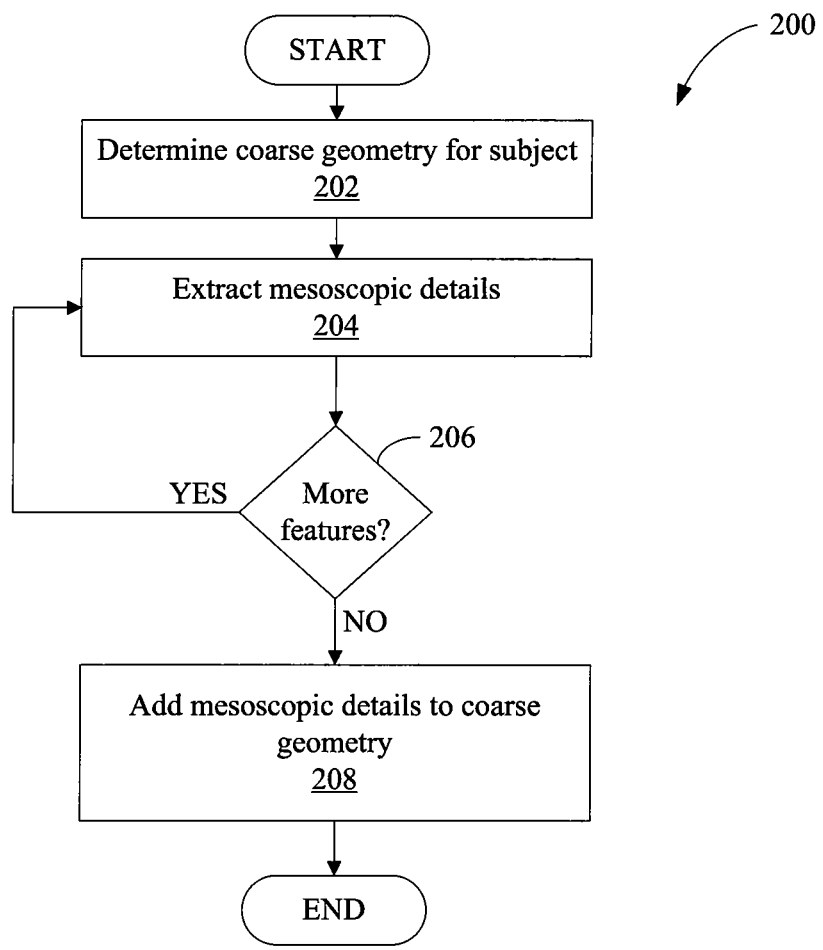
FIG. 2 is a flow diagram of method steps for recovering mesoscopic details when capturing and reconstructing a subject, according to one embodiment of the invention.

FIG. 2 is a flow diagram of method steps for recovering mesoscopic details when capturing and reconstructing a subject, according to one embodiment of the invention. Persons skilled in the art will understand that, even though the method 200 is described in conjunction with the system of FIG. 1, any system configured to perform the method steps, in any order, is within the scope of embodiments of the invention.

As shown, the method 200 begins at step 202, where a processor determines a coarse geometry for a subject. In one embodiment, the subject is a human head, and a coarse geometry for the human head includes a general shape of the head, providing a shape for the major features, such as a nose, ears, eyes, mouth, among others. Mesoscopic details (e.g., pores, imperfections, hair, among others) are not included in the coarse geometry. For example, the coarse geometry may provide a plastic-looking and/or "waxy" geometry for the subject.

Figure 3A:
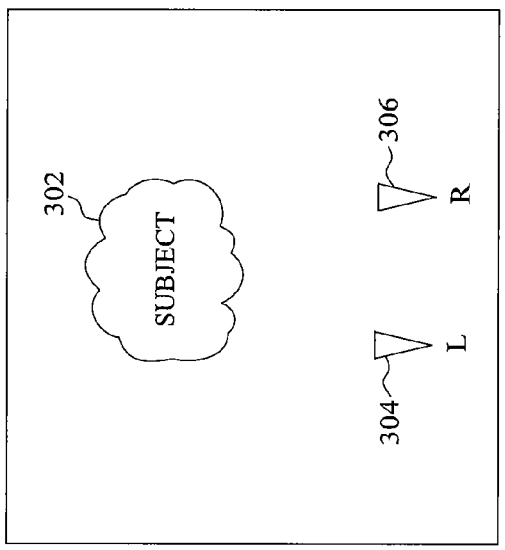
FIG. 3A is a conceptual diagram illustrating capturing a subject using two cameras, according to one embodiment of the invention.
Figure 3B:
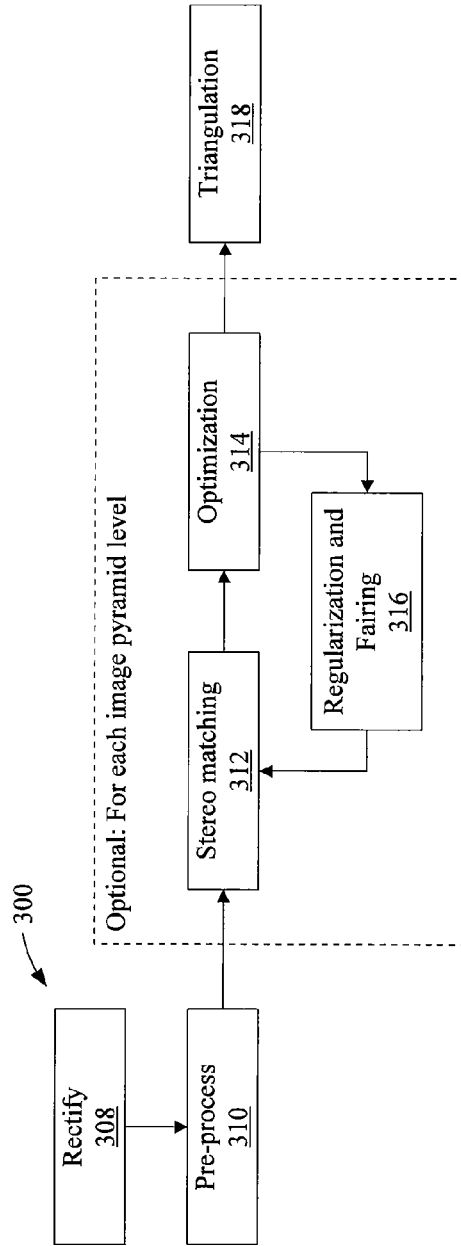
FIG. 3B is a flow diagram of method steps for performing stereo reconstruction, according to one embodiment of the invention.

In one embodiment, the coarse geometry is determined using (multi-view) stereo reconstruction, as described in FIG. 3B. In other embodiments, any other technically feasible technique for determining the coarse geometry may be implemented.

Stereo reconstruction involves finding correspondences between two images of a subject. Once the corresponding pixel and/or sub-pixel locations are determined between the two images, the reconstruction can be easily achieved. Image registration has been an intense field of research over the past several decades, not only for stereo reconstruction but also optical flow analysis, medical imaging, and others. During this time, many different techniques have been proposed.

FIG. 3A is a conceptual diagram illustrating capturing a subject 302 using two cameras 304, 306, according to one embodiment of the invention. As shown, camera 304 captures the subject 302 from the left; whereas, camera 306 captures the subject 320 from the right. In some embodiments, the images for cameras 304, 306 may be captured simultaneously to reduce temporal discontinuities. From the resultant images, stereo reconstruction may be implemented to generate the coarse geometry for the subject 302.

FIG. 3B is a flow diagram of method steps for performing stereo reconstruction, according to one embodiment of the invention. Persons skilled in the art will understand that, even though the method 300 is described in conjunction with the systems of FIGS. 1 and 3A, any system configured to perform the method steps, in any order, is within the scope of embodiments of the invention.

As shown, the method 300 begins at step 308, where a processor rectifies the images. As described, stereo reconstruction involves finding correspondences between points in one image and points in another image. For example, for a given point p in image I, stereo reconstruction involves finding corresponding point q in image J. Embodiments of the invention operate with a calibrated setup; thus, the search range can be constrained to one dimension. This constraint is called epipolar constraint and states that the corresponding point q in image J for a point p in image I has to lie on the epipolar line, and vice versa. The matching becomes especially simple when these lines correspond to the same rows in the images, which is achieved with rectification.

At step 310, the processor applies a high-pass filter to the images as a pre-processing step. In one embodiment, the subject is illuminated by a smoothly varying gradient. Illuminating the subject by a smoothly varying gradient causes the colors in the two images to differ for corresponding points. Thus, a direct comparison would most likely fail. The mismatch caused by the illumination is likely to be in the lower frequencies of the image since the gradient itself only contains low spatial frequency content. Thus, a high-pass filter can be applied to the images as a pre-processing step. For example, a Difference of Gaussians (DoG) filter may be applied to extract the high frequencies. In some embodiments, an image contains multiple sources of high spatial frequency content. One source is variation on the surface of the subject, such as texture or small surface variations. These are the desired features for matching. A second source is object boundaries, such as the silhouette of the object. To avoid mismatches caused by object boundaries, some embodiments of the invention use a mask to truncate the convolution kernel outside of the mask. Masking excludes irrelevant regions from further processing. The mask may enclose the background and possibly also hair.

At step 312, the processor performs stereo matching. In one embodiment, a block-based matching algorithm may be used (also called a patch-based or area-based matching algorithm). The matching quality is computed for all possible correspondences $q_i$ via an error function $\epsilon$ and the correspondence with lowest error is selected. Commonly used error functions include the Sum of Squared Distances (SSD), the Sum of Absolute Differences (SAD), or cross-correlation. Additional improvements may be implemented in the stereo matching algorithm, such as adding constraints, bi-directional matching, and sub-pixel matching. Still further, some embodiments of the invention may include a matching quality metric that ensures that correspondences have low error and good localization.

At step 314, the processor performs optimization. In some embodiments, stereo matching provides only a coarse initial estimation of a disparity map. This map may also include entire patches of outliers, especially at discontinuities or regions visible to only one of the cameras. One or more additional processing steps may be performed to optimize the disparity map, including patch filling and discontinuity relocation.

At step 316, the processor performs regularization and fairing. Regions only visible to one camera are likely to not be recovered by the optimization techniques performed at step 314, since those techniques rely on mutual information from both cameras. These drawbacks can be overcome by performing regularization and fairing. In some embodiments, regularization propagates information into regions that could not be matched, and fairing attenuates noise while preserving the essential features.

Additionally, to speed up computation and to be more robust with respect to noise, some embodiments of the invention perform the reconstruction over multiple scales using an "image pyramid." The image pyramid may include a predefined number of layers, where each layer is a sub-sampled version of the next lower layer. The bottom layer is the original image. Some embodiments of the invention sub-sample the images by a factor of two. To avoid aliasing, a low-pass filter may be applied to the images with a Gaussian. Let $\Delta_I$ denote the image pyramid for image I. The image pyramid includes $|\Delta_I|-1$ layers, with layer 0 comprising the original image. To express the dependency on a layer, embodiments of the invention use superscripts. Furthermore, two operators are introduced that relate the individual layers. The lifting operator $\uparrow$ lifts a point from layer l to the next higher layer (l+1) and the refinement operator $\downarrow$ takes the point in the opposite direction:

$$\uparrow : p^l \mapsto s^{-1} p^l$$

$$\downarrow : p^l \mapsto s p^l,$$

where s is the sub-sampling factor. Given two image pyramids ($\Delta_I$ and $\Delta_J$), the following pseudo-code in Table 1 defines an algorithm for fining the point q in image J that corresponds best to point p in image I:

TABLE 1

Require: Image Pyramids $\Delta_I$ and $\Delta_J$, point p
Ensure: q
  $p^0 := p$
  $p^{|\Delta_I|-1} := \uparrow (p^0)^{|\Delta_I|-2}$ {Lift p to the top layer}
  find the corresponding point $p^{|\Delta_I|-1}$ for $p^{|\Delta_J|-1}$ on the top layer
  for l = $|\Delta_I|- 2$ to 0 do
    $p^l := \downarrow (p^{l+1})$
    $q^l := \downarrow (q^{l+1})$
    update $q^l$ with the image on layer l
  end for
  $q := q^0$ At step 318, the processor performs triangulation to reconstruct the coarse geometry of the subject. Any technically feasible approach may be implemented to perform step 318, including computing an intersection of two rays or performing a least squares computation.

Again, as described above, the method 300 illustrated in FIG. 3B involving stereoscopic reconstruction provides only one technique for determining the coarse geometry for the subject (i.e., step 202 in FIG. 2). Any other technique for determining a coarse geometry for the subject is also within the scope of embodiments of the invention.

Referring back to FIG. 2, at step 204, the processor applies a band pass filter to extract mesoscopic details. As described above, the mesoscopic details contribute to the high spatial frequency content of the captured images. The technique of applying a band pass filter to extract the mesoscopic details is based on the observation that the shading in the image space is associated with the geometry of the subject. Based on this observation, embodiments of the invention present heuristics to extract the mesoscopic detail from the captured images.

According to various embodiments, each different mesoscopic detail may be associated with a different band of frequencies. For example, pores may be associated with a first band of frequencies, and facial hair may be associated with a second band of frequencies. Other bands of frequencies may be associated with other mesoscopic details, such as spots, freckles, moles, and/or fine wrinkles, among others. A separate band pass filter may be applied to the image to extract the details associated with a particular mesoscopic feature (e.g., pores).

Additionally, in some embodiments, the frequency band of a particular mesoscopic feature may be determined empirically based on knowledge of the resolution of the image, how close the subject is to the camera, and/or the size of the mesoscopic feature (e.g., average pore size). Alternatively, in other embodiments, the frequency band or range of a particular mesoscopic feature may be calculated automatically for each image being processed using a detection algorithm.

As described, the mesoscopic skin details may be extracted from images with a bandpass filter, such as:

$$\delta = s(I * f_u),$$

where $f_u$ is the bandpass filter and s is a scaling factor that controls the emboss strength of the high-frequency feature. For example, a first scale factor can be used when applying a first bandpass filter associated with a first mesoscopic feature (e.g., pores), and a second scale factor can be used when applying a second bandpass filter associated with a second mesoscopic feature (e.g., facial hair). Based on the relative strength or weakness of the scaling factors, the emboss strength of a particular feature can be accentuated or diminished. For example, applying a larger scaling factor for a first mesoscopic feature causes that feature to be more prominent in the resultant reconstruction.

At step 206, the processor determines if any other features should be extracted. If the processor determines that at least one other feature should be extracted from the images, then the method 300 returns to step 204, described above. Again, according to embodiments of the invention, each separate mesoscopic feature falls in a different band of spatial frequencies. Thus, the feedback loop between steps 206 and 204 allows embodiments of the invention to capture two or more different types of mesoscopic details in a single reconstruction. If, at step 206, the processor determines that no more features are to be extracted from the images, then the method 200 proceeds to step 208.

At step 208, the processor adds the mesoscopic detail(s) to the coarse geometry. In one embodiment, a normal displacement technique may be implemented to add the mesoscopic detail(s) to the coarse geometry, as described in FIGS. 4A-4D. In other embodiments, any other technically feasible technique may be implemented.

Figure 4A:
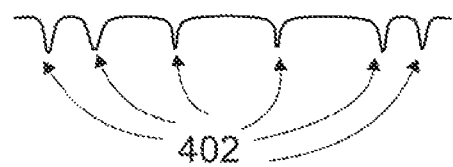
FIG. 4A is a conceptual illustration of mesoscopic details, according to one embodiment of the invention.

FIG. 4A is a conceptual illustration of mesoscopic details 402, according to one embodiment of the invention. In the example shown in FIG. 4A, the mesoscopic details 402 represent pores on skin. For example, the relative spacing of the mesoscopic details 402 represents the spacing of the pores, and the relative depth represents a depth of the pores. Again, as described in FIG. 2, these mesoscopic details are derived from the spatial frequencies in image space. In some embodiments, the spacing of the mesoscopic features corresponds to the physical spacing of those features in the subject. However, the depth of the mesoscopic features is not physically accurate.

Figure 4B:
FIG. 4B is a conceptual illustration of coarse geometry, according to one embodiment of the invention.

FIG. 4B is a conceptual illustration of a coarse geometry 404, according to one embodiment of the invention. The coarse geometry 404 may have been determined using the stereo reconstruction technique described in FIG. 3B. In other embodiments, the coarse geometry 404 may have been determined using any technically feasible technique. For example, the coarse geometry 404 may represent the tip of a nose.

Figure 4C:
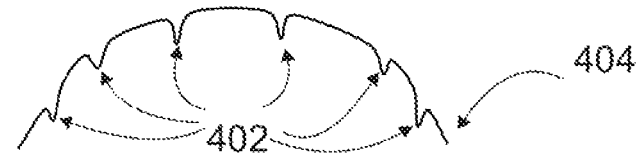
FIG. 4C is a conceptual illustration of the mesoscopic details applied to the coarse geometry with disparity displacement, according to one embodiment of the invention.

FIG. 4C is a conceptual illustration of the mesoscopic details 402 applied to the coarse geometry 404 with disparity displacement, according to one embodiment of the invention. As shown, the relative spacing of the mesoscopic details shown in FIG. 4C corresponds to the spacing of mesoscopic details 402 in FIG. 4A. However, as also shown, the pores extend directly downwards in FIG. 4C, regardless of the surface normal at that particular surface location on the coarse geometry 404.

Figure 4D:
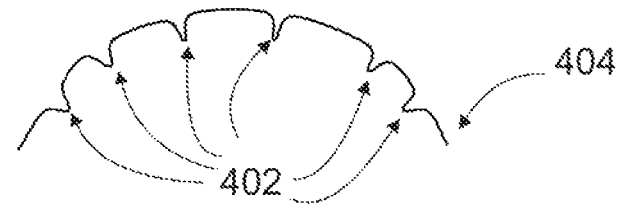
FIG. 4D is a conceptual illustration of the mesoscopic details applied to the coarse geometry with normal displacement, according to one embodiment of the invention.

FIG. 4D is a conceptual illustration of the mesoscopic details 402 applied to the coarse geometry 404 with normal displacement, according to one embodiment of the invention. As shown, the relative spacing of the mesoscopic details shown in FIG. 4D corresponds to the spacing of mesoscopic details 402 in FIG. 4A. Additionally, the mesoscopic details shown in FIG. 4D are aligned with the surface normal at each particular surface location on the coarse geometry.

Thus, embodiments of the invention offer an alternative technique for high-resolution scanning in situations where visual plausibility, and not physical correctness, is the main goal. Embodiments of the invention operate using the same data used for stereo reconstruction, which includes a single image per viewpoint. Thus, the setup required to implement embodiments of the invention is relatively inexpensive. The quality of the results, however, is sufficient for computer games and also for movies.

In some embodiments, additional improvements may be added to the techniques described herein to further improve the quality of the captured 3D model. As described, different frequency-bands are associated with different details. Thus, instead of just modulating the surface with one band of spatial frequencies, multiple bands of frequencies could be used to convey certain structure. The same effects could be achieved by using more sophisticated filters other than just bandpass filters. Additionally, in some embodiments, normal estimation at grazing angles could be employed to estimate the emboss direction of mesoscopic features. If the detail contains enough geometric variation, then the normals enclose grazing angles at some point. It is not necessary to estimate the normals, but only the variation in the normals to identify geometric detail. This variation could then be used to separate geometric and texture detail as well as the emboss direction. Another option could be to learn the features and their emboss direction with machine learning techniques following shape-from-shading approaches.

In sum, mesoscopic geometry modulation produces results which are visually close to the ones produced by current state-of-the-art normal estimation approaches, but with much less cost. Any system that can capture coarse geometry and high-resolution images can be used to improve the coarse geometry with the addition of fine details. However, since the mesoscopic details of the reconstruction are based on spatial frequency variation in image space and not actual geometric features, the mesoscopic details are not physically accurate. The results, however, are still visually pleasing. To the human observer, the results of applying embodiments of the invention are much more realistic-looking than simply using the coarse reconstruction, which appears waxy and inhuman.

Additionally, as should be apparent to those having ordinary skill in the art, embodiments of the invention can be applied to any subject, not just human faces. As long as a frequency band is determined (either pre-determined, derived analytically, or calculated empirically) for the mesoscopic features of the subject, then embodiments of the invention can be used to generate a 3D model that includes the mesoscopic features. For example, the fine lines and wrinkles of foliage may be captured using the techniques described herein.

One advantage of embodiments of the invention is the ability to produce plausible-looking high-quality facial scans from the same two images required for stereo reconstruction. Another advantage is that these techniques present a low-cost option for applications where visual plausibility is the main focus. Yet another advantage is that embodiments of the invention are easily implemented in a shading program on a GPU, since all of the computations are linear.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method of mesoscopic geometry modulation based on coarse geometry modulation without depth estimation and without geometric normal estimation, the method comprising:
   providing a plurality of filters including, for each type of a plurality of different types of mesoscopic details depicted in an image of an object, a respective filter configured to detect the respective type of mesoscopic details based on a respective range of spatial frequencies, wherein each type of mesoscopic details is detectable in the image of the object and are not detectable when generating a coarse geometry reconstruction of the object;
   applying each of the plurality of filters to the image of the object in order to obtain a respective filtered result of a plurality of filtered results, in order to determine, based on the plurality of filtered results, at least one filter of the plurality of filters that, when applied to the image of the object, indicate existence of a set containing at least one of the respective type of mesoscopic detail in the image of the object; and
   generating a three-dimensional model for the object by modulating the coarse geometry with the respective sets of mesoscopic details corresponding to each of the at least one filter without any depth estimation and without direct geometric normal estimation of the first set of mesoscopic details.

2. The method of claim 1, wherein the three-dimensional model is generated for the object by an application, wherein the application is configured to independently incur, in generating the three-dimensional model for the object, a lower processing cost than each individual estimation selected from: (i) depth estimation and (ii) geometric normal estimation.

3. The method of claim 2, further comprising determining the coarse geometry by performing stereo reconstruction based on two images of the object.

4. The method of claim 3, wherein performing stereo reconstruction comprises:
   rectifying the two images of the object;
   applying a high-pass filter to the two images of the object to extract high spatial frequency features; and
   performing stereo matching based on the high spatial frequency features.

5. The method of claim 4, wherein modulating the coarse geometry with the respective sets of mesoscopic details comprises performing an estimated normal displacement operation comprising:
   computing a macroscopic normal for each mesoscopic detail in the respective sets of mesoscopic details; and
   modulating the coarse geometry along the computed macroscopic normals to introduce mesoscopic surface variation to implicitly produce a respective mesoscopic normal for each mesoscopic detail in the respective sets of mesoscopic details.

6. The method of claim 5, wherein modulating the coarse geometry with the respective sets of mesoscopic details comprises scaling the mesoscopic details by a first scale factor.

7. The method of claim 6, wherein each range of spatial frequencies is distinct.

8. The method of claim 7, further comprising:
   scaling each set of mesoscopic details by a respective scale factor when modulating the coarse geometry.

9. The method of claim 8, wherein the range of spatial frequencies of each filter is computed based on, in respective instances, each of: a resolution associated with the image of the object, a distance between the object and a camera used to capture the image of the object, and a size of the mesoscopic details included in the respective set of mesoscopic details.

10. The method of claim 9, wherein the object comprises a human head, and the types of mesoscopic details comprise spots, freckles, moles, pores, fine wrinkles, or facial hair, respectively.

11. A non-transitory computer-readable medium storing instructions that, when executed by a processor, cause a computer system to perform mesoscopic geometry modulation based on coarse geometry modulation without depth estimation and without geometric normal estimation, by performing the steps of:
   providing a plurality of filters including, for each type of a plurality of different types of mesoscopic details depicted in an image of an object, a respective filter configured to detect the respective type of mesoscopic details based on a respective range of spatial frequencies, wherein each type of mesoscopic details is detectable in the image of the object and are not detectable when generating a coarse geometry reconstruction of the object;
   applying each of the plurality of filters to the image of the object in order to obtain a respective filtered result of a plurality of filtered results, in order to determine, based on the plurality of filtered results, at least one filter of the plurality of filters that, when applied to the image of the object, indicate existence of a set containing at least one of the respective type of mesoscopic detail in the image of the object; and
   generating a three-dimensional model for the object by modulating the coarse geometry with the respective sets of mesoscopic details corresponding to each of the at least one filter without any depth estimation and without direct geometric normal estimation of the first set of mesoscopic details.

12. The non-transitory computer-readable medium of claim 11, wherein the three-dimensional model is generated for the object by an application, wherein the application is configured to independently incur, in generating the three-dimensional model for the object, a lower processing cost than each individual estimation selected from: (i) depth estimation and (ii) geometric normal estimation.

13. The non-transitory computer-readable medium of claim 12, further comprising determining the coarse geometry by performing stereo reconstruction based on two images of the object.

14. The non-transitory computer-readable medium of claim 13, wherein performing stereo reconstruction comprises:
rectifying the two images of the object;
applying a high-pass filter to the two images of the object to extract high spatial frequency features; and
performing stereo matching based on the high spatial frequency features.

15. The non-transitory computer-readable medium of claim 14, wherein modulating the coarse geometry with the respective sets of mesoscopic details comprises performing a normal displacement operation comprising:
computing a macroscopic normal for each mesoscopic detail in the respective sets of mesoscopic details; and
modulating the coarse geometry along the computed macroscopic normals to introduce mesoscopic surface variation to implicitly produce a respective mesoscopic normal for each mesoscopic detail in the respective sets of mesoscopic details.

16. The non-transitory computer-readable medium of claim 14, wherein modulating the coarse geometry with the respective sets of mesoscopic details comprises scaling the mesoscopic details by a first scale factor.

17. The non-transitory computer-readable medium of claim 11, wherein each range of spatial frequencies is distinct.

18. The non-transitory computer-readable medium of claim 17, further comprising:
scaling each set of mesoscopic details by a respective scale factor when modulating the coarse geometry.

19. The non-transitory computer-readable medium of claim 18, wherein the range of spatial frequencies of each filter is computed based on, in respective instances, each of: a resolution associated with the image of the object, a distance between the object and a camera used to capture the image of the object, and a size of the mesoscopic details included in the respective set of mesoscopic details.

20. The non-transitory computer-readable medium of claim 19, wherein the object comprises a human head, and the types of mesoscopic details comprise spots, freckles, moles, pores, fine wrinkles, or facial hair, respectively.

21. A system for mesoscopic geometry modulation without depth estimation and without geometric normal estimation, the system comprising:
one or more computer processors; and
a memory containing a program, which, when executed by the one or more computer processors, performs an operation, the operation comprising:
providing a plurality of filters including, for each type of a plurality of different types of mesoscopic details depicted in an image of an object, a respective filter configured to detect the respective type of mesoscopic details based on a respective range of spatial frequencies, wherein each type of mesoscopic details is detectable in the image of the object and are not detectable when generating a coarse geometry reconstruction of the object;
applying each of the plurality of filters to the image of the object in order to obtain a respective filtered result of a plurality of filtered results, in order to determine, based on the plurality of filtered results, at least one filter of the plurality of filters that, when applied to the image of the object, indicate existence of a set containing at least one of the respective type of mesoscopic detail in the image of the object; and
generating a three-dimensional model for the object by modulating the coarse geometry with the respective sets of mesoscopic details corresponding to each of the at least one filter without any depth estimation and without direct geometric normal estimation of the first set of mesoscopic details.

22. The system of claim 21, wherein the three-dimensional model is generated for the object by an application, wherein the application is configured to independently incur, in generating the three-dimensional model for the object, a lower processing cost than each individual estimation selected from: (i) depth estimation and (ii) geometric normal estimation.

* * * * *